(12) United States Patent
Chiasson et al.

(10) Patent No.: US 7,181,113 B2
(45) Date of Patent: Feb. 20, 2007

(54) OPTICAL COMPONENTS HAVING IMPROVED PRINT PERMANENCE

(75) Inventors: David W. Chiasson, Hickory, NC (US); Julie A. Chalk, Hickory, NC (US)

(73) Assignee: Corning Cable Systems, LLC, Hickory, NC (US)

(*) Notice: Subject to any disclaimer, the term of this patent is extended or adjusted under 35 U.S.C. 154(b) by 188 days.

(21) Appl. No.: 10/184,243

(22) Filed: Jun. 28, 2002

(65) Prior Publication Data
US 2004/0001678 A1    Jan. 1, 2004

(51) Int. Cl.
*G02B 6/44* (2006.01)
(52) U.S. Cl. .......................... 385/114; 385/100
(58) Field of Classification Search ............... 385/114, 385/100, 102, 127, 128
See application file for complete search history.

(56) References Cited

U.S. PATENT DOCUMENTS

| | | | |
|---|---|---|---|
| 4,355,135 A | 10/1982 | January | 524/767 |
| 5,457,762 A | 10/1995 | Lochkovic et al. | 385/114 |
| 5,485,539 A | 1/1996 | Mills | 385/114 |
| 5,524,164 A | 6/1996 | Hattori et al. | 385/114 |
| 5,561,730 A | 10/1996 | Lochkovic et al. | 385/114 |
| 5,761,363 A | 6/1998 | Mills | 385/114 |
| 5,768,460 A | 6/1998 | Levi et al. | 385/114 |
| 5,958,514 A | 9/1999 | Havey et al. | 427/386 |
| 6,018,605 A | 1/2000 | Mills et al. | 385/114 |
| 6,064,789 A | 5/2000 | Mills | 385/114 |
| 6,197,422 B1 | 3/2001 | Murphy et al. | 428/378 |
| 6,253,013 B1 | 6/2001 | Lochkovic et al. | 385/114 |
| 6,343,172 B1 * | 1/2002 | Schiestle et al. | 385/101 |

OTHER PUBLICATIONS

Bulent E. Yoldas, "Design of Sol-Gel Coating Media for ink-Jet Printing", 1998, pp. 147-152.
Goddard Space Flight Center, "Tailoring Cores of Optical Fibers by a Sol-Gel Method", admitted date of Jun. 21, 2002.
Chemat Technology, Inc., "Sol-Gel Technology", 1998.
"Sol-Gel Chemistry", admitted date of Jun. 21, 2002.

* cited by examiner

*Primary Examiner*—Thien M. Le
*Assistant Examiner*—Lisa M. Caputo
(74) *Attorney, Agent, or Firm*—Michael E. Carroll, Jr.

(57) ABSTRACT

An optical component having at least one optical waveguide, a primary matrix, a secondary matrix, and a marking indicia. The primary matrix includes a first major surface and a second major surface. The secondary matrix is adjacent to the first major surface and does not completely cover the second major surface. The marking indicia may be disposed on either the primary matrix or the secondary matrix. Other embodiments include an optical component having a layer that is an absorbing material that bonds with a marking indicia. Another embodiment includes a first matrix and a second matrix having different respective coefficients of friction (COF).

28 Claims, 1 Drawing Sheet

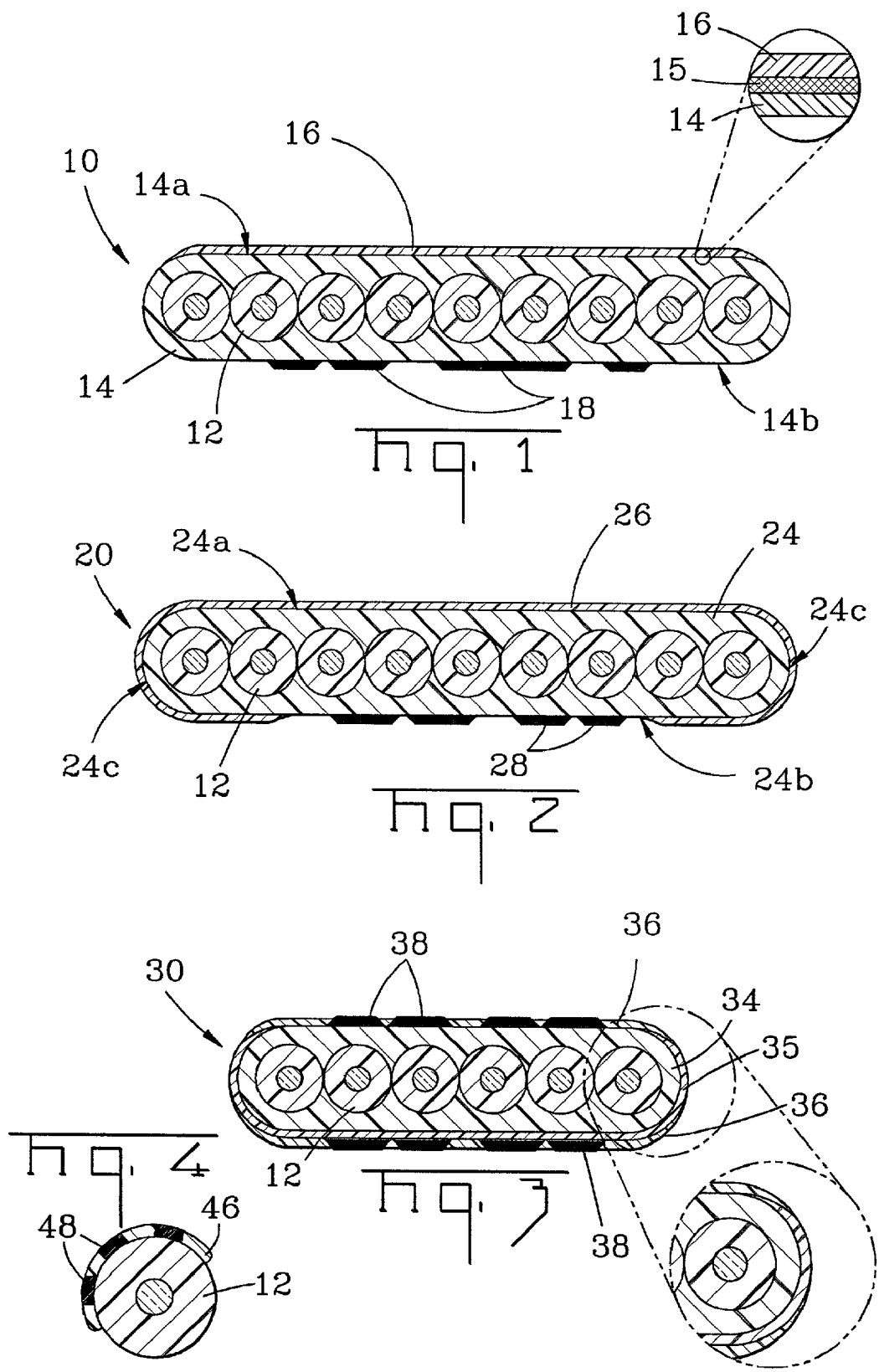

OPTICAL COMPONENTS HAVING IMPROVED PRINT PERMANENCE

FIELD OF THE INVENTION

The present invention relates generally to optical components having optical waveguides. More specifically, the invention relates to optical components with improved print permanence.

BACKGROUND OF THE INVENTION

Optical components such as fiber optic ribbons include optical waveguides such as optical fibers that transmit optical signals, for example, voice, video, and/or data information. Fiber optic cables using optical fiber ribbons can result in a relatively high optical fiber-density. In the field, the craftsman must be able to identify optical fiber ribbons so that optical connections between optical fiber ribbons can be made. Identification may be accomplished by printing markings on the optical fiber ribbons. Markings on the optical fiber ribbon must be relatively permanent to last decades, compatible with the other cable materials, and not cause unacceptable levels of optical attenuation.

Typically, fiber optic ribbons are encapsulated in an ultra-violet (UV) curable matrix. The UV curable matrix undergoes a transition from a liquid to a solid when irradiated with predetermined radiation wavelengths. Before curing, the radiation curable material includes a mixture of formulations of, for example, liquid monomers, oligomer "backbones" with acrylate functional groups, photoinitiators, and other additives.

Additives such as lubricants are added to the UV curable matrix materials to reduce the surface friction coefficient of the optical fiber ribbon. Reducing the friction coefficient allows an optical fiber ribbon to slide relative to other surfaces reducing the likelihood of localize stress, thereby preserving optical performance. However, the addition of lubricant(s) to the UV curable matrix material generally lowers the adhesion between the identification marking, such as solvent-based ink, and the matrix material, thereby resulting in a marking on the optical fiber ribbon with a relatively low permanence. In other words, the marking may not effectively penetrate or bond with the UV curable material, thereby allowing undesirable fading or wearing off of the marking.

SUMMARY OF THE INVENTION

The present invention is directed to an optical component including at least one optical waveguide, a primary matrix, a secondary matrix, and a marking indicia. The primary matrix has a first major surface and a second major surface. The secondary matrix is adjacent to the first major surface and does not completely cover the second major surface.

The present invention is also directed to a fiber optic component including at least one optical fiber, a first matrix, a second matrix, and a marking indicia. The first matrix has a first major surface, a second major surface, and ends surfaces. The second matrix is adjacent to the end surfaces and the first and second major surfaces, but does not completely cover one of the major surfaces.

The present invention is further directed to an optical component including at least one optical waveguide, at least one layer, and a marking indicia. The at least one layer is disposed on the fiber optic component and is an absorbing material. The marking indicia is disposed on the at least one layer and bonds with the at least one layer.

Additionally, the present invention is directed to an optical component including at least one optical waveguide, a first matrix, and a second matrix. The first matrix has a predetermined coefficient of friction (COF) and the second matrix has a predetermined coefficient of friction (COF). The predetermined COF of the first matrix and the predetermined COF of the second matrix are different.

BRIEF DESCRIPTION OF THE FIGS.

FIG. 1 is a cross-sectional view of a fiber optic ribbon according to one embodiment of the present invention.

FIG. 2 is a cross-sectional view of a fiber optic ribbon according to another embodiment of the present invention.

FIG. 3 is a cross-sectional view of a fiber optic ribbon according to one embodiment of the present invention.

FIG. 4 is a cross-sectional view of an optical fiber according to one embodiment of the present invention.

DETAILED DESCRIPTION OF THE INVENTION

Illustrated in FIG. 1 is a fiber optic component such as a fiber optic ribbon 10 (herein after ribbon) according to the present invention. Ribbon 10 includes a plurality of optical waveguides such as optical fibers 12, a primary matrix 14, a secondary matrix 16, and a marking indicia 18. The plurality of optical fibers 12 are arranged in a generally planar configuration with primary matrix 14 generally contacting and/or encapsulating the same, thereby forming an elongate structure. Additionally, primary matrix 14 generally inhibits relative movement between the plurality of optical fibers. Primary matrix 14 includes a first major surface 14a and a second major surface 14b. Secondary matrix 16 is adjacent to first major surface 14a and does not completely cover second major surface 14b. Marking indicia 18 is used for identification purposes, and is disposed on second major surface 14b.

As used herein, optical waveguide means any suitable optical component using internal reflection for transmitting optical signals along a predetermined path. In one embodiment, optical waveguides are a plurality of single-mode optical fibers 12; however, other types or configurations of optical fibers can be used. For example, optical fibers 12 can be multi-mode, pure-mode, erbium doped, polarization-maintaining fiber, other suitable types of light waveguides, and/or combinations thereof. For instance, each optical fiber 12 can include a silica-based core that is operative to transmit light and is surrounded by a silica-based cladding having a lower index of refraction than the core. Additionally, one or more coatings can be applied to optical fiber 12. For example, a soft primary coating surrounds the cladding, and a relatively high-modulus secondary coating surrounds the primary coating. The coating can also include an identifying element such as ink or other suitable indicia for identification of the individual optical fiber and/or an anti-adhesion agent over the identifying element that inhibits the removal of the same. Suitable optical fibers are commercially available from Corning Incorporated of Corning, N.Y.

Primary matrix 14 can be, for example, a radiation curable material or another polymeric material; however, other suitable materials can be used. Examples of radiation curable materials are polyurethane acrylate resins and polyester acrylate resin, which are commercially available. Likewise, secondary matrix 16 can be a radiation curable material or another polymeric material. Secondary matrix 16 has a thickness of a few microns; however, any other suitable dimensions can be used. In the exemplary embodiment of FIG. 1, secondary matrix 16 does not completely cover primary matrix 14, thereby leaving a portion of the primary matrix exposed for printing marking indicia 18 thereon after curing.

In one embodiment, a UV curable material is used for primary matrix 14 that excludes an effective amount of lubricant for improving print performance thereon. Excluding an effective amount of lubricant means that the matrix material consists essentially of non-lubricant matrix components; however, relatively small percentages of lubricant may be included in the matrix material. For example, lubricant can be about 1.0% or less, more preferably about 0.5% or less, by weight of the matrix material. On the other hand, secondary matrix 16 includes a suitable lubricant for reducing the coefficient of friction of ribbon 10. By excluding an effective amount of lubricant material, primary matrix 14 provides a surface that readily accepts marking indicia 18. Consequently, marking indicia 18 has an improved permanence compared with a marking indicia on a surface that includes a lubricant. On the other hand, secondary matrix 16 provides at least one surface of ribbon 10 that has a low coefficient of friction, thereby allowing ribbon 10 to slide with respect to adjacent surfaces. Thus, when a plurality of ribbons are stacked together, secondary matrix 16 of a first ribbon is adjacent to primary matrix 14 of a second ribbon, thereby reducing the coefficient of friction between the surfaces of the two ribbons. In other embodiments, primary matrix 14 includes at least one lubricant component, whereas, secondary matrix 16 excludes an effective amount of lubricant and marking indicia 18 is disposed thereon.

For example, the lubricant component of secondary matrix 16 can be a coating, or an additive that can be fugitive or non-fugitive component. Coating materials, for example, include acrylates, such as silicone acrylates, hybrid silicone-urethane acrylates, and fluorinated backbone acrylates; however, any other suitable coating materials can be used. Fugitive additives include silicone oils, fluorinated oils, or any other suitable materials. Non-fugitive additives include Teflon® waxes, polyethylene waxes, or any other suitable material.

Marking indicia 18 can be formed from any suitable material printed by any suitable apparatus. For example, a solvent-based ink can be used with an ink jet printer; however, other suitable inks such as radiation curable inks can be used. By printing marking indicia 18 on a surface not including a lubricant the permanence of the same is improved. Additionally, an adhesion zone 15 (FIG. 1) can be used between primary matrix 14 and secondary matrix 16. For example, adhesion zone 15 is applied to primary matrix 14 using a Corona discharge treatment; however, any other suitable methods can be used.

One aspect of the curing process of a radiation curable matrix material is the reaction of a photoinitiator in response to radiation exposure. A photoinitiator has an inherent absorption spectrum that is measured in terms of absorbance as a function of radiation wavelength. Each photoinitiator has a characteristic photoactive region, i.e., a photoactive wavelength range typically measured in nanometers (nm). For example, commercially available photoinitiators can have a photoactive wavelength range in the vacuum ultra-violet (160–220 nm), ultra-violet (220–400 nm), or visible light (400–700 nm) wavelength ranges.

The resulting modulus of radiation curable materials can be controlled by factors such as radiation intensity and cure time. The radiation dose, i.e., the radiant energy arriving at a surface per unit area is inversely proportional to the line speed, i.e., the speed the radiation curable moves past the radiation source. The light dose is the integral of radiated power as a function of time. In other words, all else being equal, the faster the line speed, the higher the radiation intensity must be to achieve adequate curing. After a radiation curable material has been fully irradiated, the material is said to be cured. Curing occurs in the radiation curable material from the side facing the radiation source down or away from the source. Because portions of the material closer to the radiation source can block radiation from reaching non-cured portions of the material, a cure gradient can be established. Depending on the amount of incident radiation, a cured material may exhibit different degrees of curing. Moreover, the degrees of curing in a material can have distinct modulus characteristic associated therewith. Conversely, radiation sources can be positioned so that the matrix material has a relatively uniform cure.

Thus, the degree of cure affects the mechanical characteristics through the cross-link density of the radiation curable material. For example, a significantly cured material can be defined as one with a high cross-link density for that material, which is, for example, too brittle. Further, an undercured material may be defined as one having a low cross-link density, and can be too soft, possibly having a relatively high coefficient of friction (COF) that causes an undesirable level of ribbon friction. The cured UV material has a modulus, for example, in the range of about 50 MPa to about 1500 MPa depending on the radiation dose. Different modulus values can provide varying degrees of performance with respect to, for example, print permanence and/or friction characteristics.

Another fiber optic component of the present invention is depicted in FIG. 2. FIG. 2 illustrates a ribbon 20, which is similar to ribbon 10. Ribbon 20 includes a plurality of optical waveguides, for example, optical fibers 12 arranged in a generally planar configuration with a primary matrix 24 forming an elongate structure. Primary matrix 24 generally contacts optical fibers 12 and may encapsulate the same, thereby providing a robust structure for processing and handling. Primary matrix 24 has a first major surface 24a and a second major surface 24b. In this embodiment, secondary matrix 26 is disposed on more than one surface and has a relatively low COF. Illustratively, a COF ratio between a first matrix and a second matrix material can be in the range of about 1:10 to about 1:2. Specifically, secondary matrix 26 is disposed on first major surface 24a, a portion of second major surface 24b, and a pair of end surfaces 24c. Having secondary matrix 26 disposed on end surfaces 24c advantageously reduces the friction thereof. Marking indicia 28 is printed on a portion of second major surface 24b. Preferably, marking indicia lies below the level of secondary matrix 26.

Other embodiments of the present invention can have other suitable configurations. For instance, secondary matrix 26 can be on both end surfaces 24c and portions of first and second major surfaces 24a, 24b, but excludes secondary matrix 26 from a portion of a surface of primary matrix 24. In other embodiments, marking indicia 28 is printed on primary matrix 24 that is completely covered by secondary matrix 26.

FIG. 3 depicts ribbon 30, which is similar to ribbon 10. In this embodiment, a first layer or matrix 34 may or may not include a lubricant, whereas, for example, matrix or layer 36 is formed from a material having a high affinity for marking indicia 38. In other words, layer 36, or other layers, are formed from a material that absorbs the ink, or other material, used to form marking indicia 38. Illustratively, layer 36 is an absorbing material, for example, a sol-gel material such as an aerogel that is relatively porous, thereby absorbing the ink printed thereon. Generally speaking, sol-gels are ceramic or glass materials manufactured using a process involving the transition of a system from a liquid sol (most colloidal) into a solid gel phase. Aerogels can be manufactured when the liquid in a wet gel is removed under a supercritical condition, thereby forming a highly porous sol-gel material.

Layer 36 preferably has a thickness of about 5 μm or less; however, other suitable dimensions may be used. The bonding between the ink and the absorbing layer can be either chemical, mechanical, or both. In one embodiment, the absorbing material has an acrylate component providing a component of chemical bonding. In another embodiment, the absorbing material has a fluorinated acrylate component, thereby reducing the coefficient of friction. However, any other suitable absorbing materials having a high affinity and/or bonding characteristics with marking indicia 18 can be used for layer 36.

As shown on the upper side of ribbon 30, the printing surface can be a longitudinal strip of absorbing material that is generally level with a major surface of another layer such as second matrix 35. In other embodiments, as shown on the lower side of ribbon 30, layer 36 can be disposed on other layers, for instance, second matrix 35. Other embodiments include more than one layer that bonds with the marking indicia. Moreover, the concepts of the absorptive material can be used with other suitable geometry or fiber optic components.

FIG. 4 depicts another fiber optic component employing the concepts of the present invention. In this embodiment, optical fiber 12 includes a layer 46 having a marking indicia 48 thereon. Layer 46 can be similar to layer 36, or can exclude an effective amount of lubricant, thereby improving print performance. Layer 46 is disposed on a portion of an optical fiber coating; however, the desired properties can also be formulated within the coating. In other embodiments, layer 46 may generally cover the coating of optical fiber 12. Marking indicia 48 is similar to marking indicia 18, but can have any other suitable configurations such as being generally continuous.

Many modifications and other embodiments of the present invention, within the scope of the appended claims, will become apparent to a skilled artisan. For example, other suitable optical waveguides, other than fiber optic components, can employ the concepts of the present invention. Additionally, ribbons can include different numbers of optical fibers, ribbons can be used as subunits in a splitable ribbon, or the ribbons can have other suitable shapes and/or configurations. Furthermore, ribbons of the present invention can be part of a ribbon stack or include other suitable components. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to ribbons and silica-based optical fibers, but the inventive concepts of the present invention are applicable to other suitable optical waveguides as well.

That which is claimed:

1. A fiber optic ribbon comprising:
    at least one optical waveguide;
    a primary matrix, the primary matrix having first major planar surface, and a second major planar surface;
    a secondary matrix, the secondary matrix being adjacent to the first major planar surface, wherein the secondary matrix generally covers a portion of the first and second planar surfaces, wherein one of either the primary matrix or the secondary matrix include a layer of an absorbing material; and
    a marking indicia, the marking indicia being at least partially disposed on the absorbing material, thereby bonding with the marking indicia.

2. The fiber optic ribbon according to claim 1, the layer being formed from a porous material.

3. The fiber optic ribbon according to claim 1, one of the group selected from the primary matrix and the secondary matrix excluding an effective amount of a lubricant and having the marking indicia thereon.

4. The fiber optic ribbon according to claim 1, the marking indicia being a material selected from the group of a solvent-based ink and a UV curable ink.

5. The fiber optic ribbon according to claim 1, further comprising an adhesion zone between the primary matrix and the secondary matrix.

6. The fiber optic ribbon according to claim 1, the primary matrix having a predetermined coefficient of friction, and the secondary matrix has a predetermined coefficient of friction, wherein the predetermined coefficient of friction of the secondary matrix is different than the predetermined coefficient of friction of the primary matrix.

7. The fiber optic ribbon according to claim 1, the primary matrix having a predetermined modulus, and the secondary matrix having a predetermined modulus, wherein the predetermined modulus of the primary matrix is different than the predetermined modulus of the secondary matrix.

8. The fiber optic ribbon according to claim 1, further comprising a primary matrix having at least one predetermined material characteristic, and the secondary matrix having at least one predetermined material characteristic, wherein the at least one predetermined material characteristic of the primary matrix is different than the at least one predetermined material characteristic of the secondary matrix.

9. A fiber optic component comprising:
    at least one optical fiber;
    a first matrix, the first matrix having a first major surface, a second major surface, and end surfaces;
    a second matrix, the second matrix being adjacent to the end surfaces and the first and second major surfaces, the second matrix does not completely cover the first matrix when intact;
    an absorbing layer, the absorbing layer being porous and disposed on either the first matrix or the second matrix; and
    a marking indicia, the marking indicia being at least partially disposed on the absorbing layer and bonding therewith.

10. The fiber optic component according to claim 9, the second matrix generally covering a portion of the first and second major surfaces.

11. The fiber optic component according to claim 9, one of the group selected from the first matrix and the second matrix excluding an effective amount of a lubricant.

12. The fiber optic component according to claim 9, the marking indicia being a material selected from the group of a solvent-based ink and a UV curable ink.

13. The fiber optic component according to claim 11, further comprising an adhesion zone between the first matrix and the second matrix.

14. The fiber optic component according to claim 9, the first matrix having a predetermined coefficient of friction, and the second matrix has a predetermined coefficient of friction, wherein the predetermined coefficient of friction of the second matrix is different than the predetermined coefficient of friction of the first matrix.

15. The fiber optic component according to claim 9, the first matrix having a predetermined modulus, and the second matrix having a predetermined modulus, wherein the predetermined modulus of the first matrix is different than the predetermined modulus of the second matrix.

16. The fiber optic component according to claim 9, further comprising a first matrix having at least one predetermined material characteristic, and the second matrix having at least one predetermined material characteristic, wherein the at least one predetermined material characteristic of the first matrix is different than the at least one predetermined material characteristic of the second matrix.

17. An optical component comprising:
   at least one optical waveguide;
   at least one layer, the at least one layer disposed on the fiber optic component, the at least one layer having a sol-gel component acting as an absorbing material; and
   a marking indicia, the marking indicia being disposed on the at least one layer, wherein the marking indicia bonds with the at least one layer.

18. The optical component according to claim 17, the at least one layer being formed from a porous material.

19. The optical component according to claim 17, the at least one layer having an aerogel component.

20. The optical component according to claim 17, the at least one layer further including an acrylate component.

21. The optical component according to claim 17, the at least one layer further including a fluorinated acrylate component.

22. The optical component according to claim 17, the marking indicia being a material selected from the group of a solvent-based ink and a UV curable ink.

23. The optical component according to claim 17, the at least one optical waveguide being an optical fiber.

24. The optical component according to claim 17, the at least one optical waveguide being a portion of an optical fiber ribbon, the optical fiber ribbon having a matrix material.

25. The optical component according to claim 24, further comprising an adhesion zone.

26. The optical component according to claim 24, the matrix material having a predetermined coefficient of friction, and the layer has a predetermined coefficient of friction, wherein the predetermined coefficient of friction of the layer is different than the predetermined coefficient of friction of the matrix material.

27. An optical component comprising:
   at least one optical waveguide;
   a first matrix, having a predetermined coefficient of friction (COF); and
   a second matrix, having a predetermined coefficient of friction (COF), wherein the predetermined COF of the first matrix and the predetermined COF of the second matrix have a ratio being in the range of about 1:10 to about 1:2.

28. The optical component according to claim 27, the first matrix having a first major planar surface, a second major planar surface, and arcuate end surfaces, the second matrix being adjacent to the end surfaces and the first and second major surfaces, wherein the second matrix does not completely cover one of the major surfaces.

* * * * *